(12) United States Patent
Ichiyama et al.

(10) Patent No.: US 11,098,816 B2
(45) Date of Patent: Aug. 24, 2021

(54) ELECTROMAGNETIC VALVE HAVING DURABILITY AGAINST OXYGEN, HYDROGEN AND WATER

(71) Applicant: SHINWA CONTROLS CO., LTD, Kawasaki (JP)

(72) Inventors: Ryoji Ichiyama, Kawasaki (JP); Hidemitsu Ooka, Kawasaki (JP); Hiroki Yajima, Kawasaki (JP)

(73) Assignee: Shinwa Controls Co., Ltd, Kawasaki (JP)

(*) Notice: Subject to any disclaimer, the term of this patent is extended or adjusted under 35 U.S.C. 154(b) by 255 days.

(21) Appl. No.: 16/488,650

(22) PCT Filed: Apr. 3, 2018

(86) PCT No.: PCT/JP2018/014261
§ 371 (c)(1),
(2) Date: Aug. 26, 2019

(87) PCT Pub. No.: WO2018/186393
PCT Pub. Date: Oct. 11, 2018

(65) Prior Publication Data
US 2019/0376611 A1 Dec. 12, 2019

(30) Foreign Application Priority Data
Apr. 3, 2017 (JP) .............................. JP2017-073850

(51) Int. Cl.
*F02D 41/20* (2006.01)
*F16K 31/06* (2006.01)
(Continued)

(52) U.S. Cl.
CPC .......... *F16K 31/06* (2013.01); *F02D 41/0027* (2013.01); *F02M 63/0017* (2013.01); *H01M 8/04097* (2013.01)

(58) Field of Classification Search
CPC .. F16K 31/06; F16K 31/0672; F16K 31/0655; F16K 31/0644; F16K 25/005;
(Continued)

(56) References Cited

U.S. PATENT DOCUMENTS 5,269,539 A 12/1993 Martin
10,566,124 B2 * 2/2020 Plucinski ................ F02C 7/232
(Continued)

FOREIGN PATENT DOCUMENTS

EP 0 942 214 A1 9/1999
EP 2 765 159 A1 8/2014
(Continued)

OTHER PUBLICATIONS

International Search Report and Written Opinion (Application No. PCT/JP2018/014261) dated May 15, 2018.
(Continued)

*Primary Examiner* — Hai H Huynh
(74) *Attorney, Agent, or Firm* — Burr & Brown, PLLC (57) ABSTRACT

The main component of a valve body is a ternary fluoro-rubber of a vinylidene fluoride/tetrafluoroethylene/hexafluoropropylene copolymer, the JIS K 6253 hardness of the valve body is 50-90, the tensile strength of the valve body is 10-35 MPa, and the elongation at break of the valve body is 100-500%. Relative to the inside diameter of a gas discharge channel provided to an inner-side area of the valve seat, the distance by which a movable core is moved by an electromagnetic coil is within a range of 0.1 times to 0.3 times, the diameter of the valve body is within a range of 1.5 times to 3.0 times, the thickness of the valve body is 0.3 times or greater, the protruding height of the valve seat is 0.3 times or greater, and the inside diameter of an annular gas accumulating space is 2.0 times to 5.0 times.

16 Claims, 4 Drawing Sheets

(51) Int. Cl.
*F02D 41/00* (2006.01)
*F02M 63/00* (2006.01)
*H01M 8/04089* (2016.01)

(58) Field of Classification Search
CPC .......... F16K 1/42; F16K 1/36; F16K 17/0453; F02D 41/0027; F02M 63/0017; F02M 2200/9015; H01M 8/04097; H01M 8/04089; H01M 8/04; Y02E 60/50
USPC .............. 123/525, DIG. 12, 25 J, 25 K, 25 L, 123/25 M, 25 N; 251/129.01, 129.09, 251/129.15
See application file for complete search history.

(56) References Cited

U.S. PATENT DOCUMENTS

2007/0241298 A1 10/2007 Herbert et al.
2017/0037973 A1 2/2017 Lucotte et al.

FOREIGN PATENT DOCUMENTS

| JP | 2002-195428 A1 | 7/2002 |
| JP | 2006-153223 A1 | 6/2006 |
| WO | 2015/133573 A1 | 9/2015 |

OTHER PUBLICATIONS

Extended European Search Report (Application No. 18781442.1) dated Nov. 27, 2020.

* cited by examiner

ELECTROMAGNETIC VALVE HAVING DURABILITY AGAINST OXYGEN, HYDROGEN AND WATER

TECHNICAL FIELD

The present invention relates to an electromagnetic valve having durability against oxygen, hydrogen and water flowing in a flow path.

BACKGROUND ART

For example, an electromagnetic valve for a fuel cell must have durability against oxygen, hydrogen and water flowing in a flow path. In order to ensure such durability, JP-A-2006-153223 has proposed that a valve body is made of aluminum.

As structure of an electromagnetic valve, in addition to a linear-motion type of structure disclosed in JP-A-2006-153223 (a space around a valve body is a gas accumulating space), a diaphragm type of structure disclosed in JP-A-2002-195428 (a peripheral portion of a valve body is a diaphragm part) is also known.

As described above, JP-A-2006-153223 and JP-A-2002-195428 are raised as prior art documents.

SUMMARY OF INVENTION

Technical Problem

According to the results of various experiments that have been conducted by the inventors of the present invention, as compared with the case where the valve body is made of aluminum, when the main component of the valve body is a ternary fluororubber of a vinylidene fluoride/tetrafluoroethylene/hexafluoropropylene copolymer, it has been found that there is a possibility to realize a highly durable electromagnetic valve through which oxygen, hydrogen and water in an arbitrary order.

Thus, the inventors of the present invention have further studied a specific design of an electromagnetic valve which is capable of ensuring durability in an extremely long continuous operation of several hundred hours or more, in an application in which oxygen, hydrogen and water are repeatedly flown (passed) in an arbitrary order.

While repeating such trial-and-errors and various experiments, the inventors of the present invention has confirmed that durability can be ensured in an extremely long continuous operation of several hundred hours or more if all of the following conditions are satisfied:

(1) The main component of the valve body is a ternary fluororubber of vinylidene fluoride/tetrafluoroethylene/hexafluoropropylene copolymer;

(2) The hardness of the valve body measured by a durometer type A defined by JIS K 6253 has been adjusted to 50 to 90;

(3) The tensile strength of the valve body has been adjusted to 10 to 35 MPa;

(4) The elongation at break of the valve body has been adjusted to 100 to 500%;

(5) The valve seat is made of stainless steel;

(6) With respect to an inner diameter of a gas discharge passage provided in an inner region of the valve seat, a distance in which a movable core is moved by an electromagnetic coil part has been adjusted to be within a range of 0.1 to 0.3 times;

(7) With respect to the inner diameter of the gas discharge passage, a diameter of the valve body (a diameter of an inner region with respect to a diaphragm part when the valve body is a diaphragm type) has been adjusted to be within a range of 1.5 to 3.0 times;

(8) With respect to the inner diameter of the gas discharge passage, a thickness of the valve body (a thickness of an inner region with respect to a diaphragm part when the valve body is a diaphragm type) has been adjusted to 0.3 times or more;

(9) With respect to the inner diameter of the gas discharge passage, a protruding height of the valve seat has been adjusted to 0.3 times or more; and (10) With respect to the inner diameter of the gas discharge passage, an inner diameter of an annular gas accumulating space has been adjusted to 2.0 to 5.0 times.

The present invention has been made based on the above findings. It is an object of the present invention to provide an electromagnetic valve which is capable of ensuring durability during an extremely long continuous operation of several hundred hours or more, in an application in which oxygen, hydrogen and water are repeatedly flown (passed) in an arbitrary order.

Solution to Problem

The present invention is an electromagnetic valve including: a fixed core; a movable core capable of approaching the fixed core when subjected to an action of an electromagnetic force; a valve body provided at an end of the movable core away from the fixed core; a tubular part fixed relative to the fixed core and configured to guide movement of the movable core; a gas flow path forming member connected to a side of the tubular part away from the fixed core, having an annularly protruding valve seat on which the valve body can be seated; an elastic body capable of urging the movable core in a direction of moving the movable core away from the fixed core and allowing the valve body to be seated on the valve seat; and an electromagnetic coil part capable of applying an electromagnetic force to the movable core to move the movable core toward the fixed core against the urging force of the elastic body and allowing the valve body to be released from the valve seat; wherein the tubular part and/or the gas flow path forming member has an annular gas accumulating space around the valve body of the movable core; the gas flow path forming member has a gas introduction passage in an inner region of the valve seat; the gas flow path forming member has a gas discharge passage in an outer region of the valve seat; the annular gas accumulating space and the gas discharge passage maintain their communication state regardless of how relative positions of the fixed core and the movable core are; the valve body has a ternary fluororubber of vinylidene fluoride/tetrafluoroethylene/hexafluoropropylene copolymer as a main component; a hardness of the valve body measured by a durometer type A defined by JIS K 6253 has been adjusted to 50 to 90; a tensile strength of the valve body has been adjusted to 10 to 35 MPa; an elongation at break of the valve body has been adjusted to 100 to 500%; the valve seat is made of stainless steel; with respect to an inner diameter of the gas discharge passage, a distance in which the movable core is moved by the electromagnetic coil part has been adjusted to be within a range of 0.1 to 0.3 times; with respect to the inner diameter of the gas discharge passage, a diameter of the valve body has been adjusted to be within a range of 1.5 to 3.0 times; with respect to the inner diameter of the gas discharge passage, a thickness of the valve body has been adjusted to 0.3 times or more; with respect to the inner diameter of the gas discharge passage, a protruding height of the valve seat has been adjusted to 0.3 times or more; and with respect to the inner diameter of the gas discharge passage, an inner diameter of the annular gas accumulating space has been adjusted to be within a range of 2.0 to 5.0 times.

According to the present invention, durability can be ensured even during an extremely long continuous operation of several hundred hours or more by satisfying all of the following conditions:

(1) The main component of the valve body is a ternary fluororubber of vinylidene fluoride/tetrafluoroethylene/hexafluoropropylene copolymer;

(2) The hardness of the valve body measured by a durometer type A defined by JIS K 6253 has been adjusted to 50 to 90;

(3) The tensile strength of the valve body has been adjusted to 10 to 35 MPa;

(4) The elongation at break of the valve body has been adjusted to 100 to 500%;

(5) The valve seat is made of stainless steel;

(6) With respect to an inner diameter of a gas discharge passage provided in an inner region of the valve seat, a distance in which a movable core is moved by an electromagnetic coil part has been adjusted to be within a range of 0.1 to 0.3 times;

(7) With respect to the inner diameter of the gas discharge passage, a diameter of the valve body has been adjusted to be within a range of 1.5 to 3.0 times;

(8) With respect to the inner diameter of the gas discharge passage, a thickness of the valve body has been adjusted to 0.3 times or more;

(9) With respect to the inner diameter of the gas discharge passage, a protruding height of the valve seat has been adjusted to 0.3 times or more; and (10) With respect to the inner diameter of the gas discharge passage, an inner diameter of an annular gas accumulating space has been adjusted to 2.0 to 5.0 times.

In addition, according to the findings by the inventors of the present invention, it is preferable that the valve body is made of 5 to 30 parts of MT carbon black added to and blended with 100 parts of the ternary fluororubber of vinylidene fluoride/tetrafluoroethylene/hexafluoropropylene copolymer. In this case, the durability is further improved.

Furthermore, according to the findings by the inventors of the present invention, it is preferable that a hardness of the valve body measured by a durometer type A defined by JIS K 6253 has been adjusted to 60 to 70. In this case, the durability is further improved.

Alternatively, the present invention is an electromagnetic valve including: a fixed core; a movable core capable of approaching the fixed core when subjected to an action of an electromagnetic force; a valve body provided at an end of the movable core away from the fixed core; a tubular part fixed relative to the fixed core and configured to guide movement of the movable core; a gas flow path forming member connected to a side of the tubular part away from the fixed core, having an annularly protruding valve seat on which the valve body can be seated; an elastic body capable of urging the movable core in a direction of moving the movable core away from the fixed core and allowing the valve body to be seated on the valve seat; and an electromagnetic coil part capable of applying an electromagnetic force to the movable core to move the movable core toward the fixed core against the urging force of the elastic body and allowing the valve body to be released from the valve seat; wherein a peripheral portion of a diaphragm part provided around the valve body is fixed to the tubular part and/or the gas flow path forming member; the tubular part and/or the gas flow path forming member has an annular gas accumulating space around the annularly protruding valve seat; the gas flow path forming member has a gas introduction passage in an inner region of the valve seat; the gas flow path forming member has a gas discharge passage in an outer region of the valve seat; the annular gas accumulating space and the gas discharge passage maintain their communication state regardless of how relative positions of the fixed core and the movable core are; the valve body has a ternary fluororubber of vinylidene fluoride/tetrafluoroethylene/hexafluoropropylene copolymer as a main component; a hardness of the valve body measured by a durometer type A defined by JIS K 6253 has been adjusted to 50 to 90; a tensile strength of the valve body has been adjusted to 10 to 35 MPa; an elongation at break of the valve body has been adjusted to 100 to 500%; the valve seat is made of stainless steel; with respect to an inner diameter of the gas discharge passage, a distance in which the movable core is moved by the electromagnetic coil part has been adjusted to be within a range of 0.1 to 0.3 times; with respect to the inner diameter of the gas discharge passage, a diameter of an inner region of the valve body with respect to the diaphragm part has been adjusted to be within a range of 1.5 to 3.0 times; with respect to the inner diameter of the gas discharge passage, a thickness of the inner region of the valve body with respect to the diaphragm part has been adjusted to 0.3 times or more; with respect to the inner diameter of the gas discharge passage, a protruding height of the valve seat has been adjusted to 0.3 times or more; and with respect to the inner diameter of the gas discharge passage, an inner diameter of the annular gas accumulating space has been adjusted to be within a range of 2.0 to 5.0 times.

According to the present invention, durability can be ensured even during an extremely long continuous operation of several hundred hours or more by satisfying all of the following conditions:

(1) The main component of the valve body is a ternary fluororubber of vinylidene fluoride/tetrafluoroethylene/hexafluoropropylene copolymer;

(2) The hardness of the valve body measured by a durometer type A defined by JIS K 6253 has been adjusted to 50 to 90;

(3) The tensile strength of the valve body has been adjusted to 10 to 35 MPa;

(4) The elongation at break of the valve body has been adjusted to 100 to 500%;

(5) The valve seat is made of stainless steel;

(6) With respect to an inner diameter of a gas discharge passage provided in an inner region of the valve seat, a distance in which a movable core is moved by an electromagnetic coil part has been adjusted to be within a range of 0.1 to 0.3 times;

(7) With respect to the inner diameter of the gas discharge passage, a diameter of an inner region of the valve body with respect to the diaphragm part has been adjusted to be within a range of 1.5 to 3.0 times;

(8) With respect to the inner diameter of the gas discharge passage, a thickness of the inner region of the valve body with respect to the diaphragm part has been adjusted to 0.3 times or more;

(9) With respect to the inner diameter of the gas discharge passage, a protruding height of the valve seat has been adjusted to 0.3 times or more; and (10) With respect to the inner diameter of the gas discharge passage, an inner diameter of an annular gas accumulating space has been adjusted to 2.0 to 5.0 times.

In this case as well, furthermore, it is preferable that the valve body is made of 5 to 30 parts of MT carbon black added to and blended with 100 parts of the ternary fluororubber of vinylidene fluoride/tetrafluoroethylene/hexafluoropropylene copolymer. In this case, the durability is further improved.

In addition, in this case as well, it is preferable that a hardness of the valve body measured by a durometer type A defined by JIS K 6253 has been adjusted to 60 to 70. In this case, the durability is further improved.

Advantageous Effects of Invention

According to the present invention, durability can be ensured even during an extremely long continuous operation of several hundred hours or more by satisfying all of the following conditions:

(1) The main component of the valve body is a ternary fluororubber of vinylidene fluoride/tetrafluoroethylene/hexafluoropropylene copolymer;

(2) The hardness of the valve body measured by a durometer type A defined by JIS K 6253 has been adjusted to 50 to 90;

(3) The tensile strength of the valve body has been adjusted to 10 to 35 MPa;

(4) The elongation at break of the valve body has been adjusted to 100 to 500%;

(5) The valve seat is made of stainless steel;

(6) With respect to an inner diameter of a gas discharge passage provided in an inner region of the valve seat, a distance in which a movable core is moved by an electromagnetic coil part has been adjusted to be within a range of 0.1 to 0.3 times;

(7) With respect to the inner diameter of the gas discharge passage, a diameter of the valve body (a diameter of an inner region with respect to a diaphragm part when the valve body is a diaphragm type) has been adjusted to be within a range of 1.5 to 3.0 times;

(8) With respect to the inner diameter of the gas discharge passage, a thickness of the valve body (a thickness of an inner region with respect to a diaphragm part when the valve body is a diaphragm type) has been adjusted to 0.3 times or more;

(9) With respect to the inner diameter of the gas discharge passage, a protruding height of the valve seat has been adjusted to 0.3 times or more; and (10) With respect to the inner diameter of the gas discharge passage, an inner diameter of an annular gas accumulating space has been adjusted to 2.0 to 5.0 times.

DESCRIPTION OF EMBODIMENTS

Hereinafter, embodiments of the present invention will be described with reference to the attached drawings.

Figure 1:
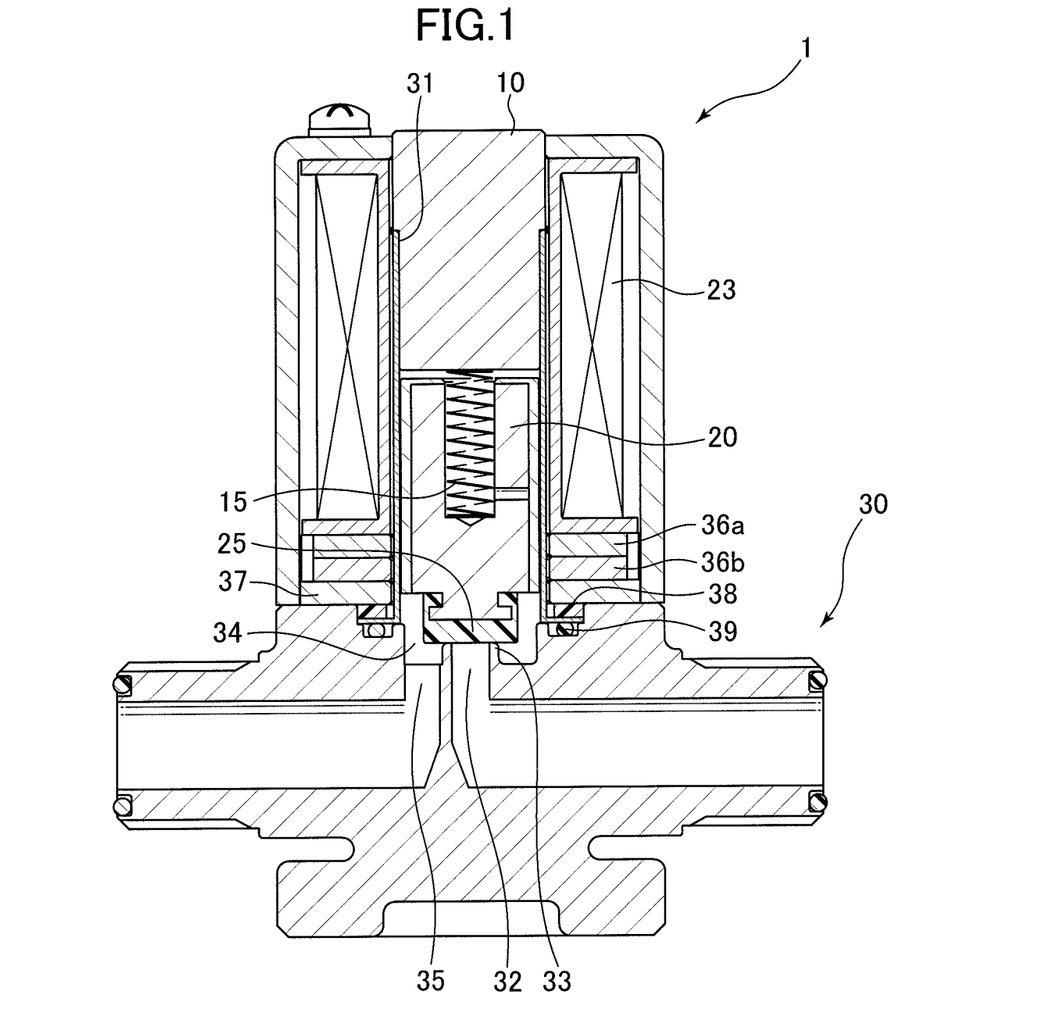
FIG. 1 is a schematic cross-sectional view of a valve closed state of an electromagnetic valve according to a first embodiment of the present invention.
Figure 2:
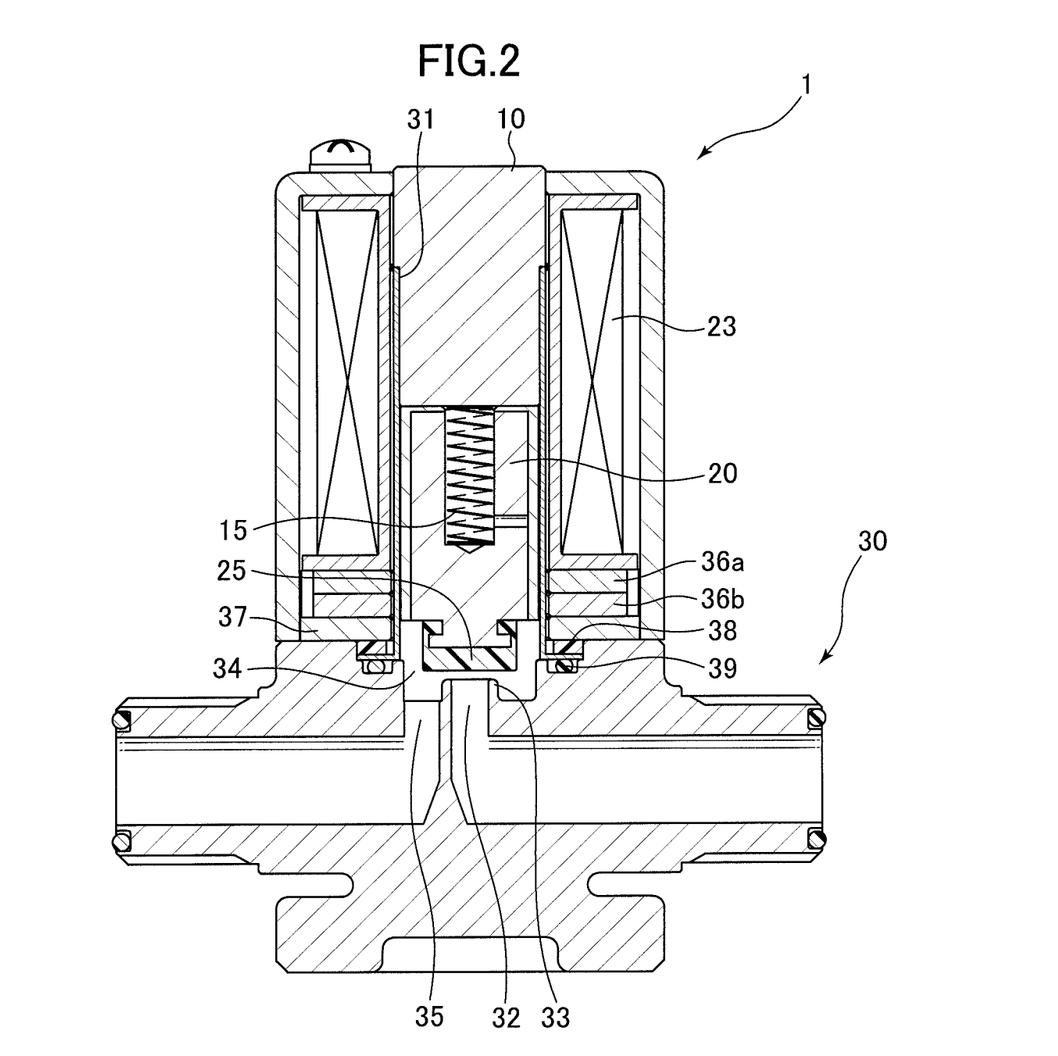
FIG. 2 is a schematic cross-sectional view of a valve opened state of an electromagnetic valve according to the first embodiment of the present invention.

FIG. 1 is a schematic cross-sectional view of a valve closed state of an electromagnetic valve according to a first embodiment of the present invention, and FIG. 2 is a schematic cross-sectional view of a valve opened state of an electromagnetic valve according to the first embodiment of the present invention.

As shown in FIGS. 1 and 2, an electromagnetic valve 1 according to the present embodiment includes: a fixed core 10; and a movable core 20 that can approach the fixed core 10 when subjected to an action of an electromagnetic force. A valve body 25 is attached to an end of the movable core 20 away from the fixed core 10.

The main component of the valve body 25 of the present embodiment is a ternary fluororubber consisting of vinylidene fluoride/tetrafluoroethylene/hexafluoropropylene copolymer (specifically, the trade name "DAI-EL G-902"). 5 to 30 parts of MT carbon black has been additively blended with 100 parts of the ternary fluororubber, followed by a vulcanization treatment.

As an example of specific characteristic values, a hardness measured by a durometer type A defined by JIS K 6253 is 69, a tensile strength is 22.7 MPa, and an elongation at break is 375%. According to the results of various experiments that have been conducted by the inventors of the present invention, it is preferable that the hardness of the valve body 25 measured by a durometer type A defined by JIS K 6253 is within the range of 50 to 90, more preferably 60 to 70, that the tensile strength of the valve body 25 is within the range of 10 to 35 MPa, and that the elongation at break of the valve body 25 is within the range of 100 to 500%;

A tubular part 31 configured to guide movement of the movable core 20 is fixed relative to the fixed core 10. A gas flow path forming member 30 is connected to a side of the tubular part 31 away from the fixed core 10, the gas flow path forming member 30 having an annularly valve seat 33 on which the valve body 25 can be seated. The valve seat 33 is made of stainless steel and protrudes from an outer region with respect to the valve seat 33 toward the fixed core 10.

In the present embodiment, the tubular part 31 and the gas flow path forming member 30 are connected via two spacer members 36a, 36b, a ring core member 37, a ring member 38 and an O-ring 39. However, a concrete connecting manner for both of them is not limited particularly.

A gas introduction hole 32 (gas introduction passage), whose cross section is circular, is provided in an inner region of the valve seat 33. In a normal state, the valve body 25 is seated on the valve seat 33 so that the gas introduction hole 32 is closed. A supply mechanism for supplying hydrogen, oxygen, and water to the gas introduction hole 32 in an arbitrary order is connected to the gas introduction hole 32 of the present embodiment. On the other hand, a gas discharge hole 35 (gas discharge passage) is provided in an outer region of the valve seat 33.

A spring 15 is provided between the fixed core 10 and the movable core 20, the spring 15 being capable of urging the movable core 20 in a direction of moving the movable core 20 away from the fixed core 10 and allowing the valve body 25 to be seated on the valve seat 33. The spring 15 may be replaced with another kind of elastic body that achieves the same function.

There is also provided an electromagnetic coil part 23, which is capable of applying an electromagnetic force to the movable core 20 to move the movable core 20 toward (closer to) the fixed core 10 against the urging force of the spring 15 and allowing the valve body 25 to be released from the valve seat 33 (gas introduction hole 32). The electromagnetic coil part 23 is connected to a control unit (not shown) via electric wires.

The tubular part 31 and the gas flow path forming member 30 has an annular gas accumulating space 34 around the valve body 25 of the movable core 20. The gas accumulating space 34 has a cylindrical shape which is rotationally symmetric with respect to an axis of the valve seat 33. As shown in FIGS. 1 and 2, an end surface of the gas accumulating space 34 away from the fixed core 10 is flat except for the valve seat 33 and defines a protruding height of the valve seat 33.

In addition, as shown in FIGS. 1 and 2, the gas accumulating space 34 and the gas discharge hole 35 maintain their communication state regardless of how relative positions of the fixed core 10 and the movable core 20 are (regardless of how a compressed/extended state of the spring 15 is).

In the present embodiment, the inner diameter of the gas introduction hole 32 is 2.3 mm. However, it can be selected from a range of about 2.0 to 4.0 mm, for example.

In the present embodiment, dimensions (sizes) of the respective members have been adjusted by using the inner diameter of the gas introduction hole 32 as a standard. Specifically, the diameter of the valve body 25 has been adjusted to be 2.0 times the inner diameter of the gas introduction hole 32 (selectable from a range of 1.5 times to 3.0 times the inner diameter of the gas introduction hole 32), the thickness of the valve of the valve body 25 has been adjusted to be 0.7 times the inner diameter of the gas introduction hole 32 (selectable from a range of 0.3 times or more the inner diameter of the gas introduction hole 32), the protruding height of the valve seat 33 has been adjusted to be 0.7 times the inner diameter of the gas introduction hole 32 (selectable from a range of 0.3 times or more the inner diameter of the gas introduction hole 32), and the inner diameter of the annular gas accumulating space 34 has been adjusted to be 4.0 times the inner diameter of the gas introduction hole 32 (selectable from a range of 2.0 times to 5.0 times the inner diameter of the gas introduction hole 32).

In addition, in the present embodiment, a distance in which the movable core 20 is moved by the electromagnetic coil part 23 has been adjusted to be 0.2 times the inner diameter of the gas introduction hole 32 (selectable from a range of 0.1 times to 0.3 times the inner diameter of the gas introduction hole 32).

Next, an operation of the present embodiment will be described.

In a normal state, the movable core 20 is biased in a direction of moving the movable core 20 away from the fixed core 10 by the urging force of the spring 15 provided between the fixed core 10 and the movable core 20, and thus the valve body 25 is seated on the valve seat 33 and the gas introduction hole 32 is closed.

When a valve opening command is inputted, the electromagnetic coil part 23 is activated via the control unit (not shown). Thus, the electromagnetic coil part 23 applies an electromagnetic force to the movable core 20, and moves the movable core 20 toward (closer to) the fixed core 10 against the urging force of the spring 15. As a result, the valve body 25 is released from the gas introduction hole 32, and the electromagnetic valve 1 is opened.

Subsequently, when a valve closing command is inputted, the electromagnetic coil part 23 is deactivated, and the electromagnetic force disappears. Thus, the movable core 20 is moved away from the fixed core 10 again by the urging force of the spring 15 so that the valve body 25 is seated on the valve seat 33 and the gas introduction hole 32 is closed.

Referring to flow of a flow medium, in a normal state, gas (hydrogen and/or oxygen) and/or water that has been supplied into the gas introduction hole 32 cannot flow into the gas discharge hole 35 when the gas introduction hole 32 is closed by the valve body 25.

When a valve opening command is inputted, the electromagnetic coil part 23 is activated and the valve body 25 is released (moved away) from valve seat 33, so that the gas (hydrogen and/or oxygen) and/or water that has been supplied into the gas introduction hole 32 flows into the gas discharge hole 35 through the gas accumulating space 34.

According to the present embodiment, due to combination of the adjustment of the dimensions (sizes) of the respective members of the electromagnetic valve 1 as described above and the material selection and/or the adjustment of the characteristic values of the valve body 25 as described above, it has been confirmed that durability can be ensured even during an extremely long continuous operation of several hundred hours or more, in an application in which oxygen, hydrogen and water are repeatedly flown (passed) in an arbitrary order (for example, in an application of an electromagnetic valve for a fuel cell).

Figure 3:
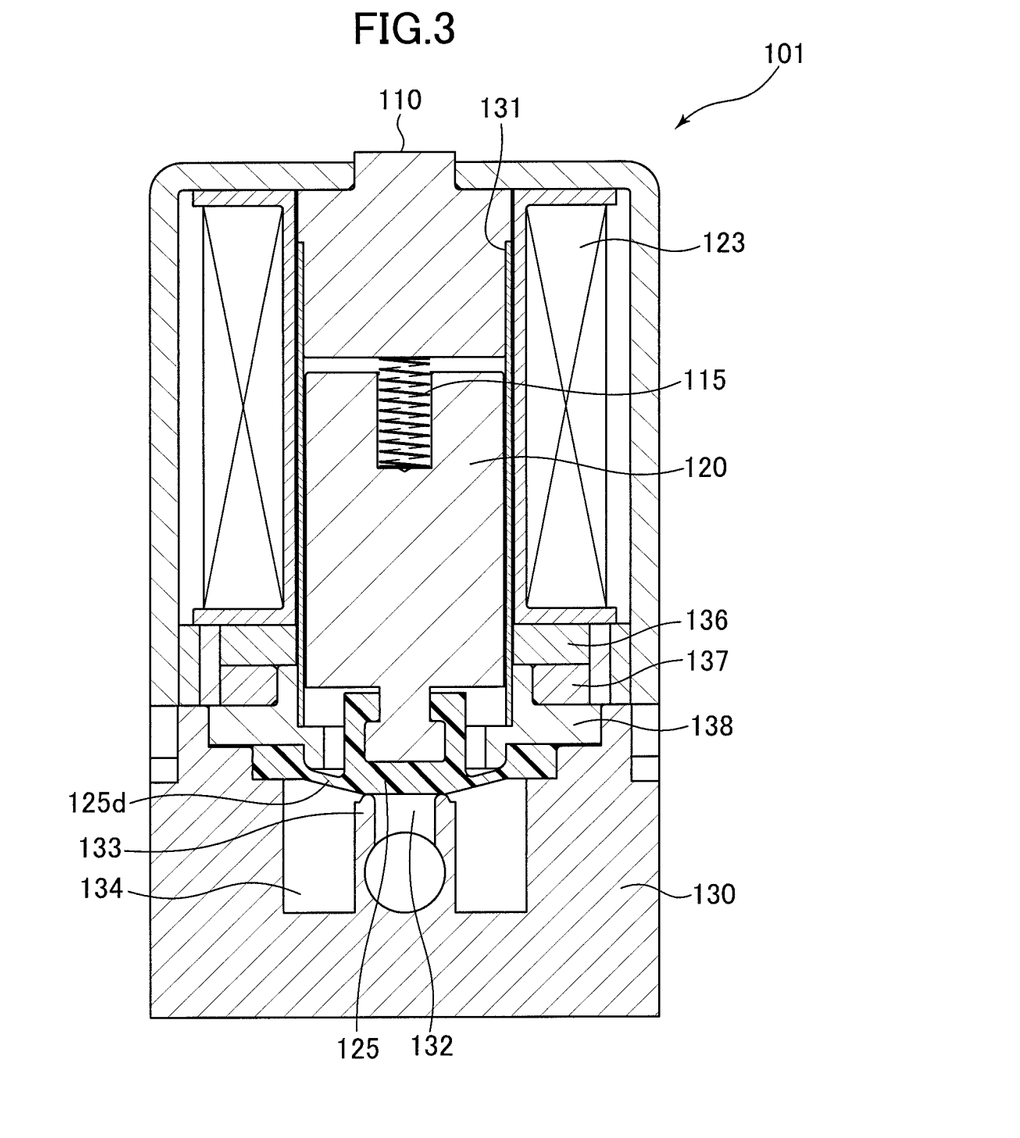
FIG. 3 is a schematic cross-sectional view of a valve closed state of an electromagnetic valve according to a second embodiment of the present invention.
Figure 4:
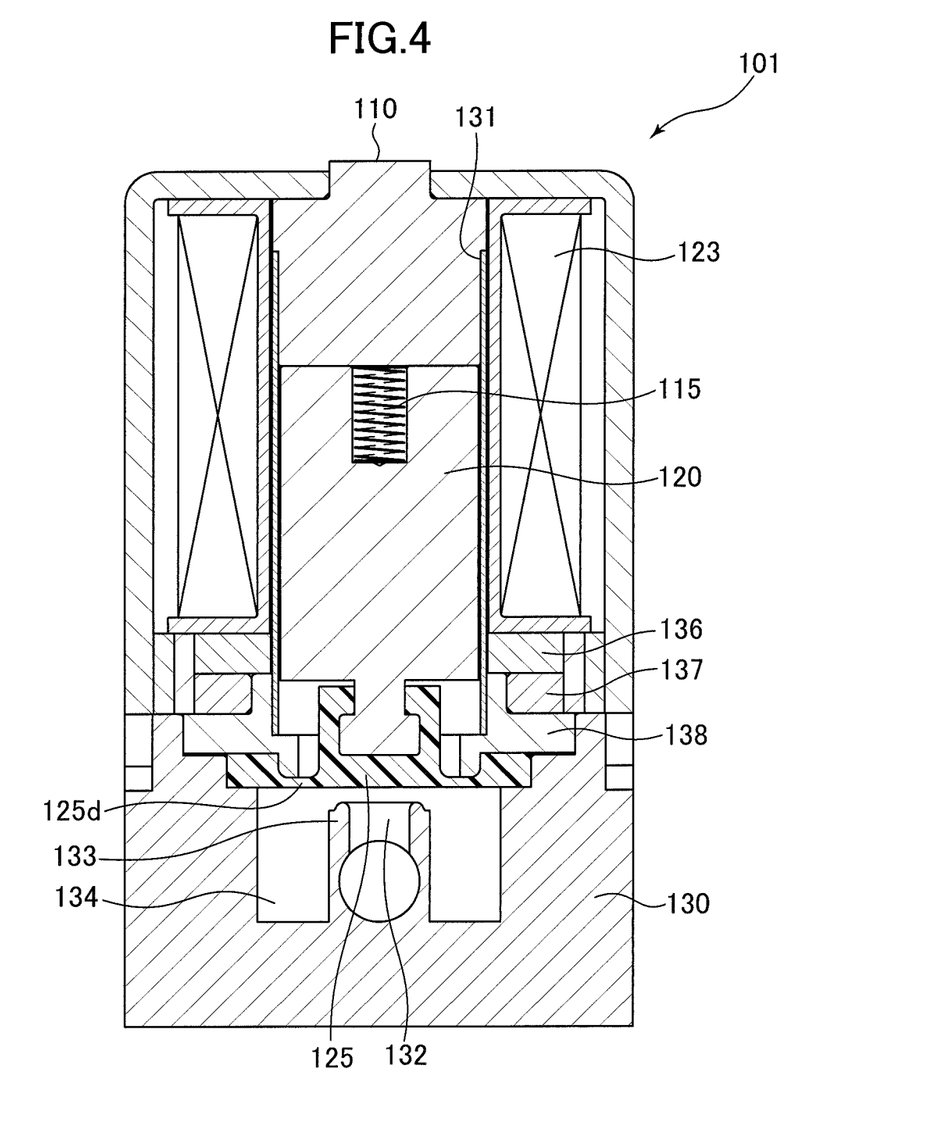
FIG. 4 is a schematic cross-sectional view of a valve opened state of an electromagnetic valve according to the second embodiment of the present invention.

Next, FIG. 3 is a schematic cross-sectional view of a valve closed state of an electromagnetic valve according to a second embodiment of the present invention, and FIG. 4 is a schematic cross-sectional view of a valve opened state of an electromagnetic valve according to the second embodiment of the present invention.

As shown in FIGS. 3 and 4, an electromagnetic valve 101 according to the present embodiment includes: a fixed core 110; and a movable core 120 that can approach the fixed core 110 when subjected to an action of an electromagnetic force. A valve body 125 is attached to an end of the movable core 120 away from the fixed core 110.

In the same way as the valve body 25 of the first embodiment, the main component of the valve body 125 of the second embodiment is also a ternary fluororubber consisting of vinylidene fluoride/tetrafluoroethylene/hexafluoropropylene copolymer (specifically, the trade name "DAI-EL G-902"). 5 to 30 parts of MT carbon black has been additively blended with 100 parts of the ternary fluororubber, followed by a vulcanization treatment.

As an example of specific characteristic values, a hardness measured by a durometer type A defined by JIS K 6253 is 69, a tensile strength is 22.7 MPa, and an elongation at break is 375%. According to the results of various experiments that have been conducted by the inventors of the present invention, it is preferable that the hardness of the valve body 125 measured by a durometer type A defined by JIS K 6253 is within the range of 50 to 90, more preferably 60 to 70, that the tensile strength of the valve body 125 is within the range of 10 to 35 MPa, and that the elongation at break of the valve body 125 is within the range of 100 to 500%. (These characteristic values do not substantially differ between a state before the valve body 125 has been molded (material state) and a state after the valve body 125 has been molded.)

On the other hand, in the valve body 125 of the present embodiment, a diaphragm part 125d is provided at an outer peripheral portion thereof. A peripheral portion of the diaphragm part 125d is fixed to a gas flow path forming member 130 and a ring member 138, which will be described later.

A tubular part 131 configured to guide movement of the movable core 120 is fixed relative to the fixed core 110. A gas flow path forming member 130 is connected to a side of the tubular part 131 away from the fixed core 110, the gas flow path forming member 130 having an annularly valve seat 133 on which the valve body 125 can be seated. The valve seat 133 is made of stainless steel and protrudes from an outer region with respect to the valve seat 133 toward the fixed core 110.

In the present embodiment, the tubular part 131 and the gas flow path forming member 130 are connected via a spacer member 136, a ring core member 137 and a ring member 138. However, a concrete connecting manner for both of them is not limited particularly.

In the present embodiment as well, a gas introduction hole 132 (gas introduction passage), whose cross section is circular, is provided in an inner region of the valve seat 133. In a normal state, the valve body 125 is seated on the valve seat 133 so that the gas introduction hole 132 is closed. A supply mechanism for supplying hydrogen, oxygen, and water to the gas introduction hole 132 in an arbitrary order is connected to the gas introduction hole 132 of the present embodiment. On the other hand, a gas discharge hole 135 (gas discharge passage) is provided in an outer region of the valve seat 133.

In the present embodiment as well, a spring 115 is provided between the fixed core 110 and the movable core 120, the spring 115 being capable of urging the movable core 120 in a direction of moving the movable core 120 away from the fixed core 110, and allowing the valve body 125 to be seated on the valve seat 133. The spring 115 may be replaced with another kind of elastic body that achieves the same function.

There is also provided an electromagnetic coil part 123, which is capable of applying an electromagnetic force to the movable core 120 to move the movable core 120 toward (closer to) the fixed core 110 against the urging force of the spring 15 and allowing the valve body 125 to be released from the valve seat 133 (gas introduction hole 132). The electromagnetic coil part 123 is connected to a control unit (not shown) via electric wires.

The tubular part 131 and the gas flow path forming member 130 has an annular gas accumulating space 134 around the valve seat 133. The gas accumulating space 134 has a cylindrical shape which is rotationally symmetric with respect to an axis of the valve seat 133. As shown in FIGS. 3 and 4, an end surface of the gas accumulating space 134 away from the fixed core 110 is flat except for the valve seat 133 and defines a protruding height of the valve seat 133.

In addition, as shown in FIGS. 3 and 4, the gas accumulating space 134 and the gas discharge hole 135 maintain their communication state regardless of how relative positions of the fixed core 110 and the movable core 120 are (regardless of how a compressed/extended state of the spring 115 is).

In the present embodiment, the inner diameter of the gas introduction hole 132 is 2.3 mm. However, it can be selected from a range of about 2.0 to 4.0 mm, for example.

In the present embodiment as well, dimensions (sizes) of the respective members have been adjusted by using the inner diameter of the gas introduction hole 132 as a standard. Specifically, the diameter of an inner region of the valve body 125 with respect to the diaphragm part 125*d* has been adjusted to be 2.0 times the inner diameter of the gas introduction hole 32 (selectable from a range of 1.5 times to 3.0 times the inner diameter of the gas introduction hole 32), the thickness of the inner region of the valve body 125 with respect to the diaphragm part 125*d* has been adjusted to be 0.7 times the inner diameter of the gas introduction hole 132 (selectable from a range of 0.3 times or more the inner diameter of the gas introduction hole 132), the protruding height of the valve seat 133 has been adjusted to be 2.0 times the inner diameter of the gas introduction hole 132 (selectable from a range of 0.3 times or more the inner diameter of the gas introduction hole 132), and the inner diameter of the annular gas accumulating space 134 has been adjusted to be 4.0 times the inner diameter of the gas introduction hole 132 (selectable from a range of 2.0 times to 5.0 times the inner diameter of the gas introduction hole 132).

In addition, in the present embodiment, a distance in which the movable core 120 is moved by the electromagnetic coil part 123 has been adjusted to be 0.2 times the inner diameter of the gas introduction hole 132 (selectable from a range of 0.1 times to 0.3 times the inner diameter of the gas introduction hole 132).

Next, an operation of the present embodiment will be described.

In a normal state, the movable core 120 is biased in a direction of moving the movable core 120 away from the fixed core 110 by the urging force of the spring 115 provided between the fixed core 110 and the movable core 120, and thus the valve body 125 is seated on the valve seat 133 and the gas introduction hole 132 is closed.

When a valve opening command is inputted, the electromagnetic coil part 123 is activated via the control unit (not shown). Thus, the electromagnetic coil part 123 applies an electromagnetic force to the movable core 120, and moves the movable core 120 toward (closer to) the fixed core 110 against the urging force of the spring 115. As a result, the diaphragm part 125*d* of the valve body 125 is deformed such that the valve body 125 is released from the gas introduction hole 132 and the electromagnetic valve 101 is opened.

Subsequently, when a valve closing command is inputted, the electromagnetic coil part 123 is deactivated, and the electromagnetic force disappears. Thus, the movable core 120 is moved away from the fixed core 110 again by the urging force of the spring 115. As a result, the diaphragm part 125*d* of the valve body 125 is deformed such that the valve body 125 is seated on the valve seat 133 and the gas introduction hole 132 is closed.

Referring to flow of a flow medium, in a normal state, gas (hydrogen and/or oxygen) and/or water that has been supplied into the gas introduction hole 132 cannot flow into the gas discharge hole 135 when the gas introduction hole 132 is closed by the valve body 125.

When a valve opening command is inputted, the electromagnetic coil part 123 is activated and the valve body 125 is released (moved away) from valve seat 133, so that the gas (hydrogen and/or oxygen) and/or water that has been supplied into the gas introduction hole 132 flows into the gas discharge hole 135 through the gas accumulating space 134.

According to the present embodiment, due to combination of the adjustment of the dimensions (sizes) of the respective members of the electromagnetic valve 101 as described above and the material selection and/or the adjustment of the characteristic values of the valve body 125 as described above, it has been confirmed that durability can be ensured even during an extremely long continuous operation of several hundred hours or more, in an application in which oxygen, hydrogen and water are repeatedly flown (passed) in an arbitrary order (for example, in an application of an electromagnetic valve for a fuel cell).

DESCRIPTION OF REFERENCE SIGNS

1 Electromagnetic valve
10 Fixed core

15 Spring
20 Movable core
23 Electromagnetic coil part
25 Valve body
30 Gas flow path forming member
31 Tubular part
32 Gas introduction hole
33 Valve seat
34 Gas accumulating space
35 Gas discharge hole
36a, 36b Spacer member
37 Core ring member
38 Ring member
39 O-ring
101 Electromagnetic valve
110 Fixed core
115 Spring
120 Movable core
123 Electromagnetic coil part
125 Valve body
125d Diaphragm part
130 Gas flow path forming member
131 Tubular part
132 Gas introduction hole
133 Valve seat
134 Gas accumulating space
135 Gas discharge hole
136 Spacer member
137 Core ring member
138 Ring member

What is claimed is:

1. An electromagnetic valve comprising
a fixed core,
a movable core capable of approaching the fixed core when subjected to an action of an electromagnetic force,
a valve body provided at an end of the movable core away from the fixed core,
a tubular part fixed relative to the fixed core and configured to guide movement of the movable core,
a gas flow path forming member connected to a side of the tubular part away from the fixed core, having an annularly protruding valve seat on which the valve body can be seated,
an elastic body capable of urging the movable core in a direction of moving the movable core away from the fixed core and allowing the valve body to be seated on the valve seat, and
an electromagnetic coil part capable of applying an electromagnetic force to the movable core to move the movable core toward the fixed core against the urging force of the elastic body and allowing the valve body to be released from the valve seat,
wherein
the tubular part and/or the gas flow path forming member has an annular gas accumulating space around the valve body of the movable core,
the gas flow path forming member has a gas introduction passage in an inner region of the valve seat,
the gas flow path forming member has a gas discharge passage in an outer region of the valve seat,
the annular gas accumulating space and the gas discharge passage maintain their communication state regardless of how relative positions of the fixed core and the movable core are,
the valve body has a ternary fluororubber of vinylidene fluoride/tetrafluoroethylene/hexafluoropropylene copolymer as a main component,
a hardness of the valve body measured by a durometer type A defined by JIS K 6253 has been adjusted to 50 to 90,
a tensile strength of the valve body has been adjusted to 10 to 35 MPa,
an elongation at break of the valve body has been adjusted to 100 to 500%,
the valve seat is made of stainless steel,
with respect to an inner diameter of the gas discharge passage, a distance in which the movable core is moved by the electromagnetic coil part has been adjusted to be within a range of 0.1 to 0.3 times,
with respect to the inner diameter of the gas discharge passage, a diameter of the valve body has been adjusted to be within a range of 1.5 to 3.0 times,
with respect to the inner diameter of the gas discharge passage, a thickness of the valve body has been adjusted to 0.3 times or more,
with respect to the inner diameter of the gas discharge passage, a protruding height of the valve seat has been adjusted to 0.3 times or more, and
with respect to the inner diameter of the gas discharge passage, an inner diameter of the annular gas accumulating space has been adjusted to be within a range of 2.0 to 5.0 times.

2. The electromagnetic valve according to claim 1, wherein
the valve body is made of 5 to 30 parts of MT carbon black added to and blended with 100 parts of the ternary fluororubber of vinylidene fluoride/tetrafluoroethylene/hexafluoropropylene copolymer.

3. The electromagnetic valve according to claim 2, wherein
a hardness of the valve body measured by a durometer type A defined by JIS K 6253 has been adjusted to 60 to 70.

4. The electromagnetic valve according to claim 3, wherein
a supply mechanism for supplying hydrogen, oxygen and water is connected to the gas introduction passage.

5. The electromagnetic valve according to claim 2, wherein
a supply mechanism for supplying hydrogen, oxygen and water is connected to the gas introduction passage.

6. The electromagnetic valve according to claim 1, wherein
a hardness of the valve body measured by a durometer type A defined by JIS K 6253 has been adjusted to 60 to 70.

7. The electromagnetic valve according to claim 6, wherein
a supply mechanism for supplying hydrogen, oxygen and water is connected to the gas introduction passage.

8. The electromagnetic valve according to claim 1, wherein
a supply mechanism for supplying hydrogen, oxygen and water is connected to the gas introduction passage.

9. An electromagnetic valve comprising
a fixed core,
a movable core capable of approaching the fixed core when subjected to an action of an electromagnetic force,
a valve body provided at an end of the movable core away from the fixed core, a tubular part fixed relative to the fixed core and configured to guide movement of the movable core, a gas flow path forming member connected to a side of the tubular part away from the fixed core, having an annularly protruding valve seat on which the valve body can be seated, an elastic body capable of urging the movable core in a direction of moving the movable core away from the fixed core and allowing the valve body to be seated on the valve seat, and an electromagnetic coil part capable of applying an electromagnetic force to the movable core to move the movable core toward the fixed core against the urging force of the elastic body and allowing the valve body to be released from the valve seat, wherein a peripheral portion of a diaphragm part provided around the valve body is fixed to the tubular part and/or the gas flow path forming member, the tubular part and/or the gas flow path forming member has an annular gas accumulating space around the annularly protruding valve seat, the gas flow path forming member has a gas introduction passage in an inner region of the valve seat, the gas flow path forming member has a gas discharge passage in an outer region of the valve seat, the annular gas accumulating space and the gas discharge passage maintain their communication state regardless of how relative positions of the fixed core and the movable core are, the valve body has a ternary fluororubber of vinylidene fluoride/tetrafluoroethylene/hexafluoropropylene copolymer as a main component, a hardness of the valve body measured by a durometer type A defined by JIS K 6253 has been adjusted to 50 to 90, a tensile strength of the valve body has been adjusted to 10 to 35 MPa, an elongation at break of the valve body has been adjusted to 100 to 500%, the valve seat is made of stainless steel, with respect to an inner diameter of the gas discharge passage, a distance in which the movable core is moved by the electromagnetic coil part has been adjusted to be within a range of 0.1 to 0.3 times, with respect to the inner diameter of the gas discharge passage, a diameter of an inner region of the valve body with respect to the diaphragm part has been adjusted to be within a range of 1.5 to 3.0 times, with respect to the inner diameter of the gas discharge passage, a thickness of the inner region of the valve body with respect to the diaphragm part has been adjusted to 0.3 times or more, with respect to the inner diameter of the gas discharge passage, a protruding height of the valve seat has been adjusted to 0.3 times or more, and with respect to the inner diameter of the gas discharge passage, an inner diameter of the annular gas accumulating space has been adjusted to be within a range of 2.0 to 5.0 times.

10. The electromagnetic valve according to claim 9, wherein the valve body is made of 5 to 30 parts of MT carbon black added to and blended with 100 parts of the ternary fluororubber of vinylidene fluoride/tetrafluoroethylene/hexafluoropropylene copolymer.

11. The electromagnetic valve according to claim 10, wherein a hardness of the valve body measured by a durometer type A defined by JIS K 6253 has been adjusted to 60 to 70.

12. The electromagnetic valve according to claim 11, wherein a supply mechanism for supplying hydrogen, oxygen and water is connected to the gas introduction passage.

13. The electromagnetic valve according to claim 10, wherein a supply mechanism for supplying hydrogen, oxygen and water is connected to the gas introduction passage.

14. The electromagnetic valve according to claim 9, wherein a hardness of the valve body measured by a durometer type A defined by JIS K 6253 has been adjusted to 60 to 70.

15. The electromagnetic valve according to claim 14, wherein a supply mechanism for supplying hydrogen, oxygen and water is connected to the gas introduction passage.

16. The electromagnetic valve according to claim 9, wherein a supply mechanism for supplying hydrogen, oxygen and water is connected to the gas introduction passage.

* * * * *